United States Patent
Yuan et al.

(10) Patent No.: US 12,177,571 B2
(45) Date of Patent: Dec. 24, 2024

(54) IMAGE CAPTURING DEVICE AND AUTO-FRAMING METHOD APPLIED THEREFOR

(71) Applicant: CHICONY ELECTRONICS CO., LTD., New Taipei (TW)

(72) Inventors: Shang-Yuan Yuan, New Taipei (TW); Tung-Hsin Huang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 37 days.

(21) Appl. No.: 17/870,379

(22) Filed: Jul. 21, 2022

(65) Prior Publication Data
US 2023/0239573 A1    Jul. 27, 2023

(30) Foreign Application Priority Data
Jan. 27, 2022    (TW) .................... 111103703

(51) Int. Cl.
*H04N 23/69*    (2023.01)
(52) U.S. Cl.
CPC .................... *H04N 23/69* (2023.01)

(58) Field of Classification Search
CPC ....................................................... H04N 23/69
See application file for complete search history.

(56) References Cited

U.S. PATENT DOCUMENTS 10,701,274 B2 *    6/2020   Tsubusaki ............ H04N 23/635

* cited by examiner

*Primary Examiner* — Twyler L Haskins
*Assistant Examiner* — Fayez A Bhuiyan
(74) *Attorney, Agent, or Firm* — MUNCY, GEISSLER, OLDS & LOWE, P.C.

(57) ABSTRACT

An image capturing device includes an optical zoom lens module, a processing module, and a motion sensing module. The optical zoom lens module captures an image corresponding to a first field of view according to a preset parameter. An auto-framing unit of the processing module defines a second field of view according to the position of a main object in the image corresponding to the first field of view, and the second field of view is smaller than the first field of view. The processing module controls the optical zoom lens module to capture images corresponding to the second field of view. When the motion sensing module detects that a suspected object enters the first field of view, it transmits a switching signal to the processing module, which controls the optical zoom lens module to capture the image corresponding to the first field of view.

19 Claims, 6 Drawing Sheets

IMAGE CAPTURING DEVICE AND AUTO-FRAMING METHOD APPLIED THEREFOR

BACKGROUND

1. Technical Field

The present disclosure relates to an image capturing device and an auto-framing method applied therefor.

2. Description of the Related Art

With the development of electronic products and communication technology, video calls or video conferences are being used more and more frequently. Among other components, an image capturing device is indispensable for video calls or video conferences. The image capturing device can be a camera with a communication function (such as the camera of a mobile phone, a tablet computer, a laptop computer or other equivalent electronic devices), or a web camera. In order to facilitate the user experience of video calls or video conferences, an image capturing device with an auto-framing function is invented accordingly. The auto-framing function allows the image capturing device to automatically identify a target object (such as a human face) within a capture frame, and to automatically adjust the image capturing device to an optimal frame view.

Conventionally, the auto-framing method implemented in the image capturing device is to perform image identification within a shooting range, such that when the position of a target object within the view is identified, a digital zoom mechanism would be applied to capture an area covering the target object. That is, the digital zoom mechanism would zoom in the area for being used as the optimal frame view. Further, while applying the digital zoom mechanism, the shooting range is still fixed; therefore, even when the image within the optimal frame view is being outputted, the image capturing device can still perform image identification to the area outside of the optimal frame view, which is generally called as an auto-tracking function.

However, the disadvantage of the digital zoom mechanism is that the quality of the outputted image is bad because it is being captured within an enlarged optimal frame view. If the optimal frame view is enlarged by means of an optical zoom mechanism, although the quality of the image can be maintained, the shooting range would be narrowed down to the optimal frame view. As a result, the optical zoom mechanism can no longer identify whether a new object (such as a human face) enters the shooting range and thus losing the auto-tracking function.

Therefore, there is a need to provide an image capturing device and an auto-framing method applied therefor capable of utilizing an optical zoom mechanism to enlarge the image as well as maintaining the auto-tracking function to mitigate and/or obviate the aforementioned problems.

SUMMARY

It is an object of the present disclosure to provide an image capturing device and an auto-framing method applied therefor, wherein a motion sensing module is provided, and a processing module is utilized to control an optical zoom lens module to capture images corresponding to different fields of view, so as to resolve the problem of lack of the auto-tracking function caused by the conventional practice of utilizing the optical zoom mechanism to enlarge images.

To achieve the abovementioned objects, the present disclosure provides an image capturing device, which comprises an optical zoom lens module, a processing module and a motion sensing module. The optical zoom lens module configures to capture an image corresponding to a first field of view according to a preset parameter. The processing module is electrically connected to the optical zoom lens module. The processing module includes an auto-framing unit. The auto-framing unit is configured to define a second field of view according to the position of a main object in the image corresponding to the first field of view, wherein the second field of view is smaller than the first field of view. The processing module is configured to control the optical zoom lens module to capture an image corresponding to the second field of view. The motion sensing module is electrically connected to the processing module. When the motion sensing module detects that a suspected object enters the first field of view, the motion sensing module transmits a switching signal to the processing module. The processing module controls the optical zoom lens module to capture an image corresponding to a third field of view according to the switching signal.

To achieve the abovementioned objects, the present disclosure further provides an auto-framing method applied for an image capturing device. The image capturing device comprises an optical zoom lens module, a processing module and a motion sensing module. The processing module is electrically connected to the optical zoom lens module and the motion sensing module, and the processing module has an auto-framing unit. The auto-framing method comprises the following steps of: the optical zoom lens module capturing an image corresponding to a first field of view according to a preset parameter; the auto-framing unit of the processing module defining a second field of view according to the position of a main object in the image corresponding to the first field of view, wherein the second field of view is smaller than the first field of view; the processing module controlling the optical zoom lens module to capture an image corresponding to the second field of view; when the motion sensing module detecting that a suspected object enters the first field of view, the motion sensing module transmitting a switching signal to the processing module; and the processing module controlling the optical zoom lens module to capture an image corresponding to a third field of view according to the switching signal.

According to one embodiment of the present disclosure, the preset parameter is a minimum magnification ratio or a largest field of view of the optical zoom lens module.

According to one embodiment of the present disclosure, the processing module comprises a face identification unit used for identifying the main object or the suspected object.

According to one embodiment of the present disclosure, the third field of view covers the suspected object.

According to one embodiment of the present disclosure, the switching signal includes a position information of the suspected object, and the processing module controls the optical zoom lens module to capture the image corresponding to the third field of view according to the position information. According to one embodiment of the present disclosure, the auto-framing unit redefines the second field of view according to at least one of the position of the main object and the position of the suspected object.

According to one embodiment of the present disclosure, the motion sensing module comprises a radar.

To achieve the abovementioned objects, the present disclosure provides an image capturing device, which comprises an optical zoom lens module, a processing module and a motion sensing module. The optical zoom lens module captures an image corresponding to a first field of according to a preset parameter. The processing module is electrically connected to the optical zoom lens module. The processing module includes an auto-framing unit. The auto-framing unit defines a second field of view according to the position of a main object in the image corresponding to the first field of view, wherein the second field of view is smaller than the first field of view. The processing module controls the optical zoom lens module to capture an image corresponding to the second field of view. The motion sensing module is electrically connected to the processing module. When the motion sensing module detects that a suspected object enters the first field of view, the motion sensing module transmits a switching signal to the processing module. The processing module controls the optical zoom lens module to capture an image corresponding to the first field of view according to the switching signal.

To achieve the abovementioned objects, the present disclosure further provides an auto-framing method applied for an image capturing device. The image capturing device comprises an optical zoom lens module, a processing module and a motion sensing module. The processing module is electrically connected to the optical zoom lens module and the motion sensing module, and the processing module has an auto-framing unit. The auto-framing method comprises the following steps of: the optical zoom lens module capturing an image corresponding to a first field of view according to a preset parameter; the auto-framing unit of the processing module defining a second field of view according to the position of a main object in the image corresponding to the first field of view, wherein the second field of view is smaller than the first field of view; the processing module controlling the optical zoom lens module to capture an image corresponding to the second field of view; when the motion sensing module detecting that a suspected object enters the first field of view, the motion sensing module transmitting a switching signal to the processing module; and the processing module controlling the optical zoom lens module to capture an image corresponding to the first field of view according to the switching signal.

According to one embodiment of the present disclosure, the preset parameter is a minimum magnification ratio or a largest field of view of the optical zoom lens module.

According to one embodiment of the present disclosure, the processing module comprises a face identification unit used for identifying the main object or the suspected object.

According to one embodiment of the present disclosure, after the processing module controls the optical zoom lens module to capture the image corresponding to the first field of view according to the switching signal, the auto-framing unit redefines the second field of view according to the position of the main object and the position of the suspected object in the image corresponding to the first field of view. According to one embodiment of the present disclosure, the auto-framing unit redefines the second field of view according to at least one of the position of the main object and the position of the suspected object in the image corresponding to the third field of view.

According to one embodiment of the present disclosure, the motion sensing module comprises a radar or an infrared sensor.

As described above, according to the image capturing device and the auto-framing method of the present disclosure, the image capturing device comprises an optical zoom lens module, a processing module and a motion sensing module. The optical zoom lens module can capture an image corresponding to a first field of view according to a preset parameter. The auto-framing unit of the processing module defines a second field of view according to the position of a main object in the image corresponding to the first field of view, and the optical zoom lens module captures an image corresponding to the second field of view. Meanwhile, the motion sensing module keeps detecting the first field of view, such that when it detects that a new object (i.e., a suspected object) enters the first field of view, the processing module can control the optical zoom lens module to capture an image corresponding to the first field of view, or to capture an image corresponding to a third field of view (which covers the suspected object). In other words, the optical zoom lens module would return to its default setting for capturing the image corresponding to the first field of view, or would capture the image covering the suspected object (i.e., within the third field of view), thereby achieving the auto-tracking function.

DETAILED DESCRIPTION OF THE EMBODIMENTS

In order to make the structure, characteristics, and effectiveness of the present disclosure further understood and recognized, a detailed description of the present disclosure is provided as follows, along with embodiments and accompanying figures.

Figure 1:
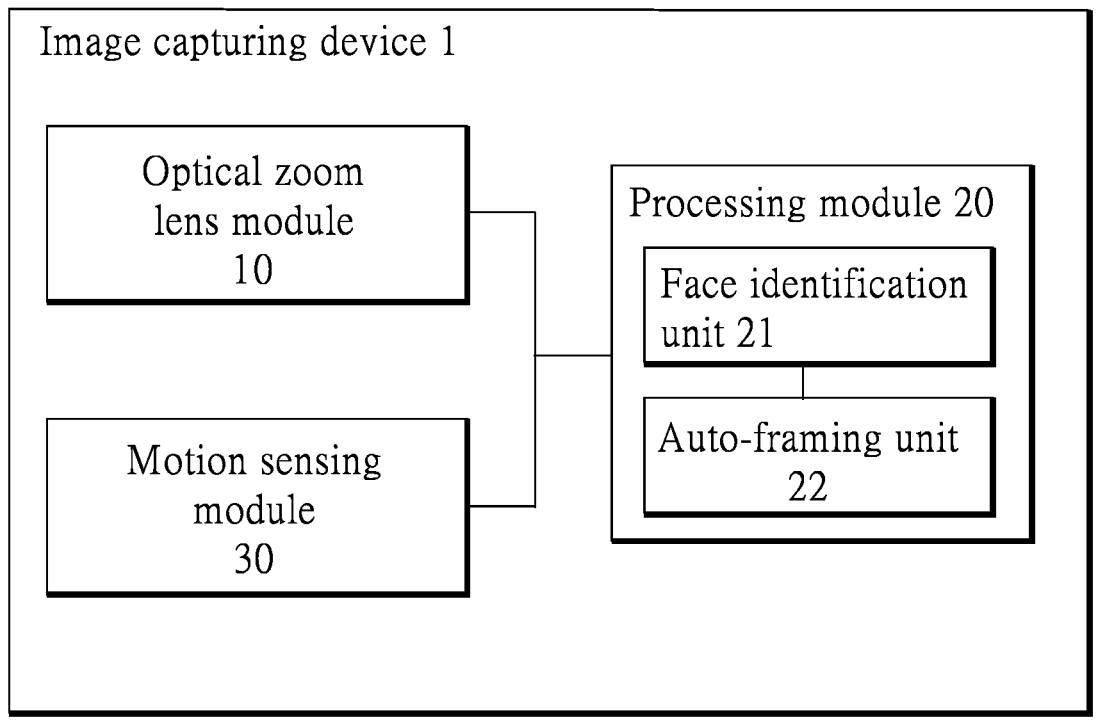
FIG. 1 illustrates a block diagram of an image capturing device according to one embodiment of the present disclosure.
Figure 2:
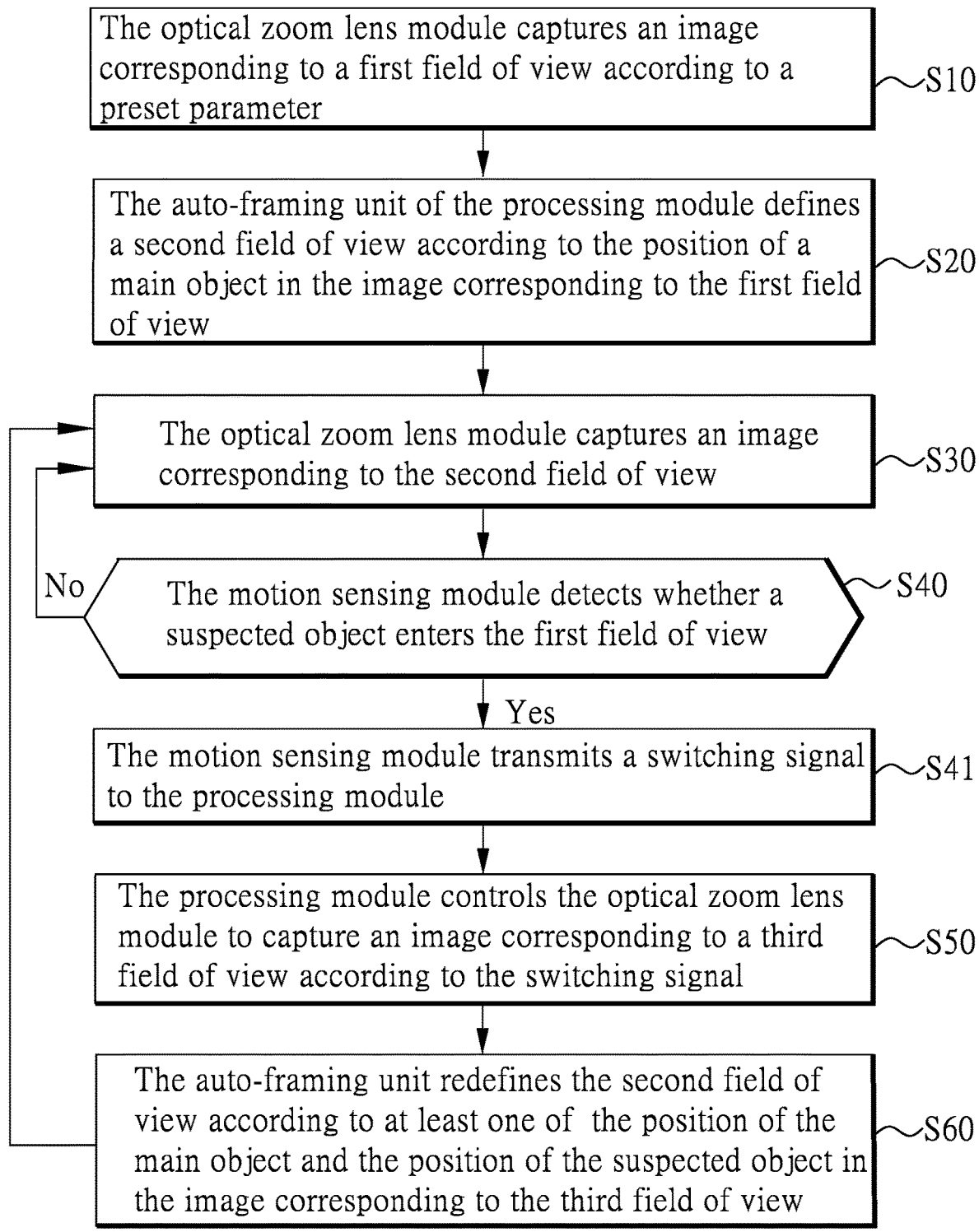
FIG. 2 illustrates a flowchart of an auto-framing method according to one embodiment of the present disclosure.

Please refer to FIG. 1 and FIG. 2. FIG. 1 illustrates a block diagram of an image capturing device according to one embodiment of the present disclosure, and FIG. 2 illustrates a flowchart of an auto-framing method according to one embodiment of the present disclosure. In this embodiment, the image capturing device 1 comprises an optical zoom lens module 10, a processing module 20 and a motion sensing module 30. Further, the image capturing device 1 is used for performing the auto-framing method as shown in FIG. 2. Preferably, the image capturing device 1 in this embodiment can be an image capturing device 1 installed in a laptop computer, a tablet computer, a mobile phone or other equivalent electronic devices. In other embodiments, the image capturing device 1 can also be a camera, a video camera or other devices. In other embodiments, the image capturing device 1 can also be an image capturing device equipped in monitoring equipment or a smart doorbell. The optical zoom lens module 10 can comprise an optical zoom lens, an image sensor or other components used for photo shooting or videotaping. The optical zoom lens can achieve the zoom function by means of utilizing the relative positions between its internal convex lens and concave lens. The image sensor can be a charge coupled device (CCD) or a complementary metal-oxide semiconductor (CMOS). The image sensor can convert a light signal into an analog electric signal, so as to output the image captured within a field of view (or a so-called shooting range).

In this embodiment, the processing module 20 can be, but not limited to, a digital signal processor (DSP) or a central processing unit (CPU). In this embodiment, the processing module 20 can be a processor of the aforementioned electronic device. The processing module 20 is electrically connected to the optical zoom lens module 10, so as to receive an image corresponding to the field of view from the optical zoom lens module 10, and to control the optical zoom lens module 10 to capture images corresponding to different fields of view. Details of related implementation will be described hereinafter.

The motion sensing module 30 in this embodiment is used for detecting whether a moving object or an animal enters a sensing area. The motion sensing module 30 can be, but not limited to, a radar or an infrared sensor. The motion sensing module 30 is also electrically connected to the processing module 20. The processing module 20 can adjust the field of view to be captured by the optical zoom lens module 10 according to the result detected by the motion sensing module 30. Similarly, details of related implementation will be described hereinafter.

Please note that each of the abovementioned modules can be configured as a hardware device, a software program, firmware or a combination thereof, and it can also be configured as a circuit loop or in other appropriate forms. Each module can be connected, in a wired or wireless manner, to one another for data receiving and transmitting. Moreover, each of the modules can be arranged independently or jointly. Further, the embodiments disclosed herein only describe preferred embodiments of the present disclosure. To avoid redundant description, not all possible variations and combinations are described in detail in this specification. However, those skilled in the art would understand the above modules or components are not all necessary parts. And, in order to implement the present disclosure, other more detailed known modules or components might also be included. It is possible that each module or component can be omitted or modified depending on different requirements; and it is also possible that other modules or components might be disposed between any two modules.

Please refer to the flowchart showing the auto-framing method depicted in FIG. 2, which further explains how the processing module 20 adjusts the field of view to be captured by the optical zoom lens module 10 in order to achieve the auto-framing function of the present disclosure. Please refer to FIG. 1, FIG. 2, and FIG. 3(a) to FIG. 3(d), wherein FIG. 3(a) to FIG. 3(d) illustrate schematic drawings of the auto-framing method as shown in FIG. 2.

Step S10: The optical zoom lens module 10 captures an image corresponding to a first field of view FOV1 according to a preset parameter.

Figure 3A:
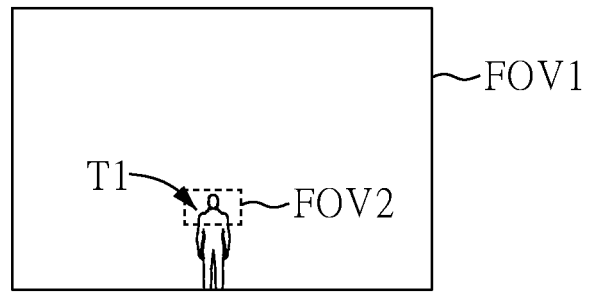
FIG. 3(a) to FIG. 3(d) illustrate schematic drawings of the auto-framing method as shown in FIG. 2.

In this embodiment, the first field of view FOV1 refers to the default setting of the field of view to be captured by the optical zoom lens module 10. The default setting of the optical zoom lens module 10 can be the largest scope that an optical zoom lens can capture, i.e., the largest field of view, as shown in FIG. 3(a). Therefore, the preset parameter can be either a minimum magnification ratio or a largest field of view of the optical zoom lens module 10.

In this embodiment, the image capturing device 1 is installed in an electronic device, and is used for the scenario such as a video call or a video conference. When a user turns on the image capturing device 1, the optical zoom lens module 10 can capture an image corresponding to the first field of view FOV1 according to the preset parameter, i.e., capture the image according to the largest field of view, wherein the image corresponding to the first field of view FOV1 covers at least one portrait or at least one human face.

Step S20: The auto-framing unit 22 of the processing module 20 defines a second field of view FOV2 according to the position of a main object T1 in the image corresponding to the first field of view FOV1.

After the processing module 20 receives the image corresponding to the largest field of view (i.e., the first field of view FOV1) captured by the optical zoom lens module 10, the processing module 20 would perform image identification. For example, the processing module 20 can firstly identify whether the image has portrait features or face features, and then define them as a main object T1. In this embodiment, the usage scenario of the image capturing device 1 is for a video call or a video conference. Preferably, the processing module 20 may have a face identification unit 21 used for identifying whether the image corresponding to the first field of view FOV1 has face features, and for defining at least one object including the face feature as the main object T1. In other words, the main object T1 can comprise at least one face feature. For example, when the image corresponding to the first field of view FOV1 has one face feature, the face feature can be defined as the main object T1. When the image corresponding to the first field of view FOV1 has multiple face features, those face features can all be defined as the main object T1. In other words, the image corresponding to the first field of view FOV1 can comprise multiple main objects T1.

Further, the processing module 20 has an auto-framing unit 22, which can define a second field of view FOV2 according to the position of the main object T1 in the image corresponding to the first field of view FOV1. That is, the auto-framing unit 22 would define the area covering the main object T1 as the second field of view FOV2, and the second field of view FOV2 is smaller than the first field of view FOV1. For example, when the image corresponding to the first field of view FOV1 has a face feature, the face feature would be defined as the main object T1. In this embodiment, the auto-framing unit 22 can then define the area covering the face feature and partial portrait as the second field of view FOV2, so as to meet the usage scenario for the video call or the video conference, as shown in the second field of view FOV2 depicted as a dotted frame in FIG. 3(a).

In one embodiment of the present disclosure, the image corresponding to the first field of view FOV1 can comprise multiple main objects T1, and the second field of view FOV2 defined by the auto-framing unit 22 can comprise all of those main objects T1.

Please note that the main object T1 can be defined according to the usage scenarios or requirements applied by the image capturing device 1. As stated above, the usage scenario of this embodiment is a video call or a video conference, therefore the face features can all be defined as the main object T1. In other embodiments, the image capturing device 1 can be installed in a smart doorbell or environment monitoring equipment for the purpose of such as home security and monitoring. As such, the image corresponding to the first field of view FOV1 may comprise human bodies or other animals. The processing module 20 can comprise an identification unit used for identifying whether the image corresponding to the first field of view FOV1 has a human body or other animals, and for further defining the human body or other animals as the main object T1.

Step S30: The optical zoom lens module 10 captures an image corresponding to the second field of view FOV2.

Figure 3B:
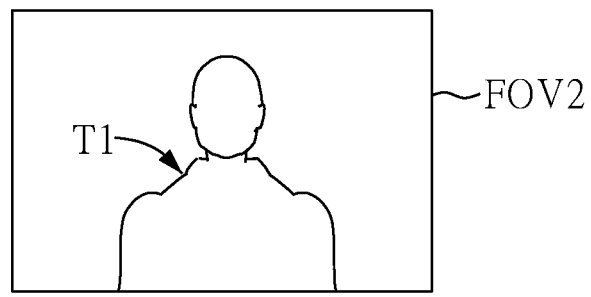

Next, the processing module 20 controls the optical zoom lens module 10 to adjust the optical zoom lens to focus on the second field of view FOV2 to capture the image corresponding to the second field of view FOV2, as shown in FIG. 3(b). More specifically, the ratio of the optical zoom lens is magnified such that the shooting range that the optical zoom lens module 10 can capture is narrowed down to the second field of view FOV2 accordingly. Please note that FIG. 3(b) may also be explained as a schematic drawing of the second field of view FOV2 displayed on the electronic device. In this embodiment, when the user is having a video call or a video conference, the electronic device can display images corresponding to the second field of view FOV2, as shown in FIG. 3(b).

Step S40: The motion sensing module 30 detects whether a suspected object T2 enters the first field of view FOV1.

In this embodiment, the sensing area of the motion sensing module 30 can be configured as being overlapped with the first field of view FOV1. As a result, the motion sensing module 30 can detect whether other moving objects, human bodies or other animals, collectively, suspected objects T2, enter the first field of view FOV1. In this embodiment, the motion sensing module 30 can be a radar or an infrared sensor. The radar can be used for detecting whether there is other moving object within the sensing area. The infrared sensor can be a passive infrared sensing module, used for receiving or measuring infrared radiation energy emitted by or reflected from an object within the sensing area, so that it can be used for detecting whether other human body or animal enter the sensing area.

Figure 3C:
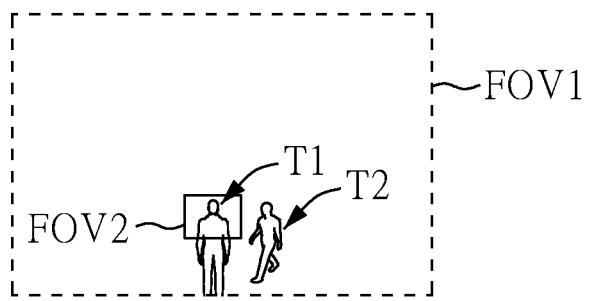
Figure 3:
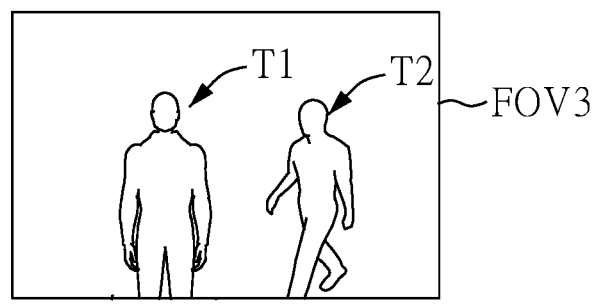

Therefore, at the same time the optical zoom lens module 10 is capturing the images corresponding to the second field of view FOV2, such as at the same time the user is having the video call or the video conference, the image capturing device 1 of this embodiment can still keep detecting the area of the first field of view FOV1 by means of the motion sensing module 30, so as to check whether a new moving object, human body or animal enters the first field of view FOV1. In other words, when a moving object, human body or animal exists outside of the second field of view FOV2 but within the first field of view FOV1, as shown in FIG. 3(c), the motion sensing module 30 can determine that a suspected object T2 enters the first field of view FOV1, and the disclosure would then perform step S41. Otherwise, if the motion sensing module 30 determines that no suspected object T2 enters the first field of view FOV1, the disclosure would keep performing step S30 to continue the video call or the video conference.

Step S41: The motion sensing module 30 transmits a switching signal to the processing module 20.

In this embodiment, when the motion sensing module 30 detects that the suspected object T2 enters the first field of view FOV1, the motion sensing module 30 would transmit a switching signal to the processing module 20. The processing module 20 can control the optical zoom lens module 10, according to the switching signal, to adjust the zoom parameter to zoom out the lens for expanding the field of view, such that the expanded field of view (or called as a temporary field of view) would cover both the main object T1 and the suspected object T2, so as to capture the image corresponding to the expanded field of view.

In one embodiment, the switching signal may comprise information related to the suspected object T2, such as the position, orientation, distance or number of the suspected object T2.

In one embodiment, the processing module 20 can control the optical zoom lens module 10 to be adjusted to a setting parameter for expanding the field of view according to the switching signal.

Step S50: The processing module 20 controls the optical zoom lens module 10 to capture an image corresponding to a third field of view FOV3 according to the switching signal, wherein the image corresponding to the third field of view FOV3 covers the main object T1 and the suspected object T2.

In this embodiment, the processing module 20 adjusts the optical zoom lens module 10 according to the switching signal, so as to reduce the ratio of the optical zoom lens, and thus to control the optical zoom lens module 10 to capture the image corresponding to the third field of view FOV3 (i.e., the temporary field of view). As shown in FIG. 3(d), the third field of view FOV3 is larger than the second field of view FOV2, and is smaller than the first field of view FOV1. In FIG. 3(d), the image corresponding to the third field of view FOV3 covers both the main object T1 and the suspected object T2.

Therefore, while the optical zoom lens module 10 is capturing the image corresponding to the second field of view FOV2 during the monitoring, video call or video conference, the image capturing device 1 can still keep detecting the area of the first field of view FOV1 by means of the motion sensing module 30. If a new object (i.e., the suspected object T2) enters the first field of view FOV1, the optical zoom lens module 10 would adjust its zoom parameter to capture the image corresponding to a larger field of view, thereby achieving the function of tracking a new object.

Step S60: The auto-framing unit 22 redefines the second field of view FOV2 according to at least one of the position of the main object T1 and the position of the suspected object T2 in the image corresponding to the third field of view FOV3.

Preferably, the processing module 20 of this embodiment can perform re-calculation to the image corresponding to the third field of view FOV3 captured by the optical zoom lens module 10 (in step S50). More specifically, the processing module 20 can perform image identification to the image corresponding to the third field of view FOV3, and to locate the object from the image corresponding to the third field of view FOV3, so as to redefine the second field of view FOV2, such that the redefined second field of view FOV2 can cover the desired object For example, if the image capturing device 1 of this embodiment is used for the doorbell monitoring, video call or video conference, the face identification unit 21 of the processing module 20 can firstly identify whether the suspected object T2 in the image comprises at least one face feature. If yes, it means the suspected object T2 might be a visitor, or other participant for the video call or the video conference; therefore, the redefined second field of view FOV2 can cover both the main object T1 and the suspected object T2. Otherwise, if the suspected object T2 does not comprise any face feature, it means the suspected object T2 could be other animal or other moving object; therefore, the redefined second field of view FOV2 can be returned to cover only the main object T1.

Specifically, the auto-framing unit 22 of the processing module 20 can redefine the second field of view FOV2 according to the position of the main object T1 or the position of the suspected object T2 in the image corresponding to the third field of view FOV3. In one embodiment, if the suspected object T2 comprises a face feature, the auto-framing unit 22 can redefine the second field of view FOV2 as the area covering both the main object T1 and the suspected object T2. In another embodiment, if the suspected object T2 does not comprise any face feature, the auto-framing unit 22 can redefine the second field of view FOV2 as the area covering only the main object T1.

As a result, during the video call or the video conference (in step S30), the motion sensing module 30 would keep detecting the area of the first field of view FOV1 (in step S40). If a new object (i.e., the suspected object T2) enters the first field of view FOV1 (in step S41), the optical zoom lens module 10 would expand the shooting range by capturing the image covering both the main object T1 and the suspected object T2 corresponding to the third field of view FOV3 (in step S50), and the auto-framing unit 22 would redefine the second field of view FOV2 according to the position of the main object T1 or the position of the suspected object T2 to cover the desired objects. In other words, during the video call or the video conference, if a new object (i.e., the suspected object T2) enters an area outside of the second field of view FOV2, the optical zoom lens module 10 can still automatically expand the shooting range (i.e., the third field of view FOV3) by capturing the image covering both the main object T1 and the suspected object T2, thereby achieving the auto-tracking function without the need of having the user to adjust the shooting range manually.

Figure 4A:
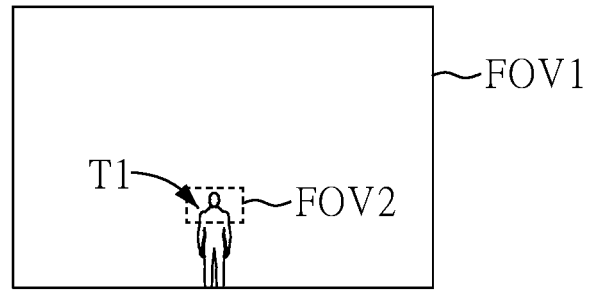
FIG. 4(a) to FIG. 4(d) illustrate schematic drawings according to another embodiment of the auto-framing method as shown in FIG. 2.
Figure 4B:
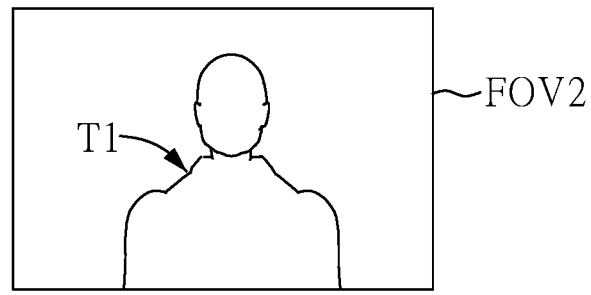

Please refer to FIG. 1, FIG. 2, and FIG. 4(a) to FIG. 4(d), wherein FIG. 4(a) to FIG. 4(d) illustrate schematic drawings according to another embodiment of the auto-framing method as shown in FIG. 2. According to the above description, the auto-framing method in this embodiment also comprises that: the optical zoom lens module 10 captures an image corresponding to a first field of view FOV1 according to a preset parameter (step S10); the auto-framing unit 22 of the processing module 20 defines a second field of view FOV2 according to the position of a main object T1 in the image corresponding to the first field of view FOV1 (step S20), as shown in FIG. 4(a); the processing module 20 controls the optical zoom lens module 10 to capture an image corresponding to the second field of view FOV2 (step S30), as shown in FIG. 4(b); the motion sensing module 30 detects whether a suspected object T2 enters the first field of view FOV1 (step S40); if yes, the motion sensing module 30 transmits a switching signal to the processing module 20 (step S41), wherein the switching signal comprises a position information of the suspected object T2; the processing module 20 controls the optical zoom lens module 10 to capture an image corresponding to a third field of view FOV3' according to the position information (step S50). The difference between this embodiment and the abovementioned embodiment is that the third field of view FOV3' mainly covers the area of the suspected object T2 and not necessarily covers the main object T1.

Figure 4C:
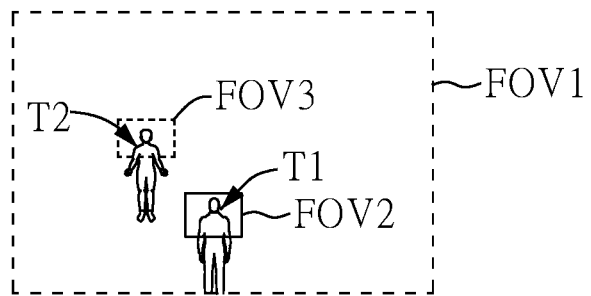

In step S40 of this embodiment, if the motion sensing module 30 determines that the suspected object T2 is located outside of the second field of view FOV2, as shown in FIG. 4(c), the motion sensing module 30 can transmit a switching signal to the processing module 20. As stated above, the switching signal may comprise information related to the suspected object T2, such as the position, orientation, distance or number of the suspected object T2. In this embodiment, the third field of view FOV3' covers the area of the suspected object T2 because it is defined according to the position information of the suspected object T2.

Figure 4D:
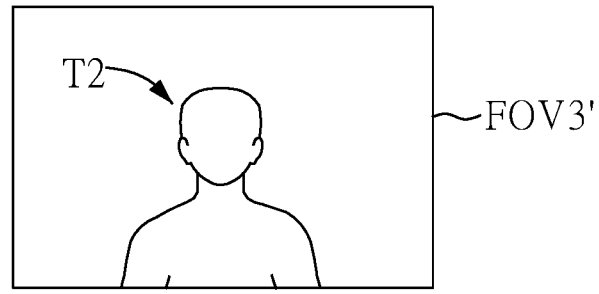

More specifically, the motion sensing module 30 of this embodiment can be a radar. The radar not only can detect a moving object within a sensing area, but also can further obtain the position information of the moving object. In step S40, when the motion sensing module 30 detects that a moving object (i.e., the suspected object T2) enters the sensing area (i.e., the first field of view FOV1), step S41 would be performed subsequently. The motion sensing module 30 would then transmit the switching signal comprising the position information of the suspected object T2 to the processing module 20. In step S50, the processing module 20 controls the optical zoom lens module 10 to capture the image corresponding to the third field of view FOV3' according to the position information of the suspected object T2, as shown in FIG. 4(d). The third field of view FOV3' covers the suspected object T2, therefore the auto-tracking function can be achieved. Next, in step S60, the processing module 20 performs re-calculation to the image corresponding to the third field of view FOV3' captured by the optical zoom lens module 10, so as to re-adjust the optical zoom lens module 10. For example, the auto-framing unit 22 of the processing module 20 would redefine the second field of view FOV2 according to the position of the suspected object T2 in the image corresponding to the third field of view FOV3. The redefined second field of view FOV2 can be accomplished by re-focusing or re-adjusting the shooting angle. For example, the suspected object T2 is aligned in the center of the second field of view FOV2.

In this embodiment, during the video call or the video conference (in step S30), the motion sensing module 30 would keep detecting the area of the first field of view FOV1 (in step S40). If a new object (i.e., the suspected object T2) enters the first field of view FOV1, the processing module 20 can control the optical zoom lens module 10 to capture the image covering the new object corresponding to the third field of view FOV3' according to the position information of the switching signal (in step S50). In short, during the video call or the video conference, if a new object (i.e., the suspected object T2) enters the area outside of the second field of view FOV2, the optical zoom lens module 10 can automatically capture the image of the suspected object T2 (i.e., within the third field of view FOV3), thereby achieving the auto-tracking function without the need of having the user to adjust the shooting range manually.

Figure 5:
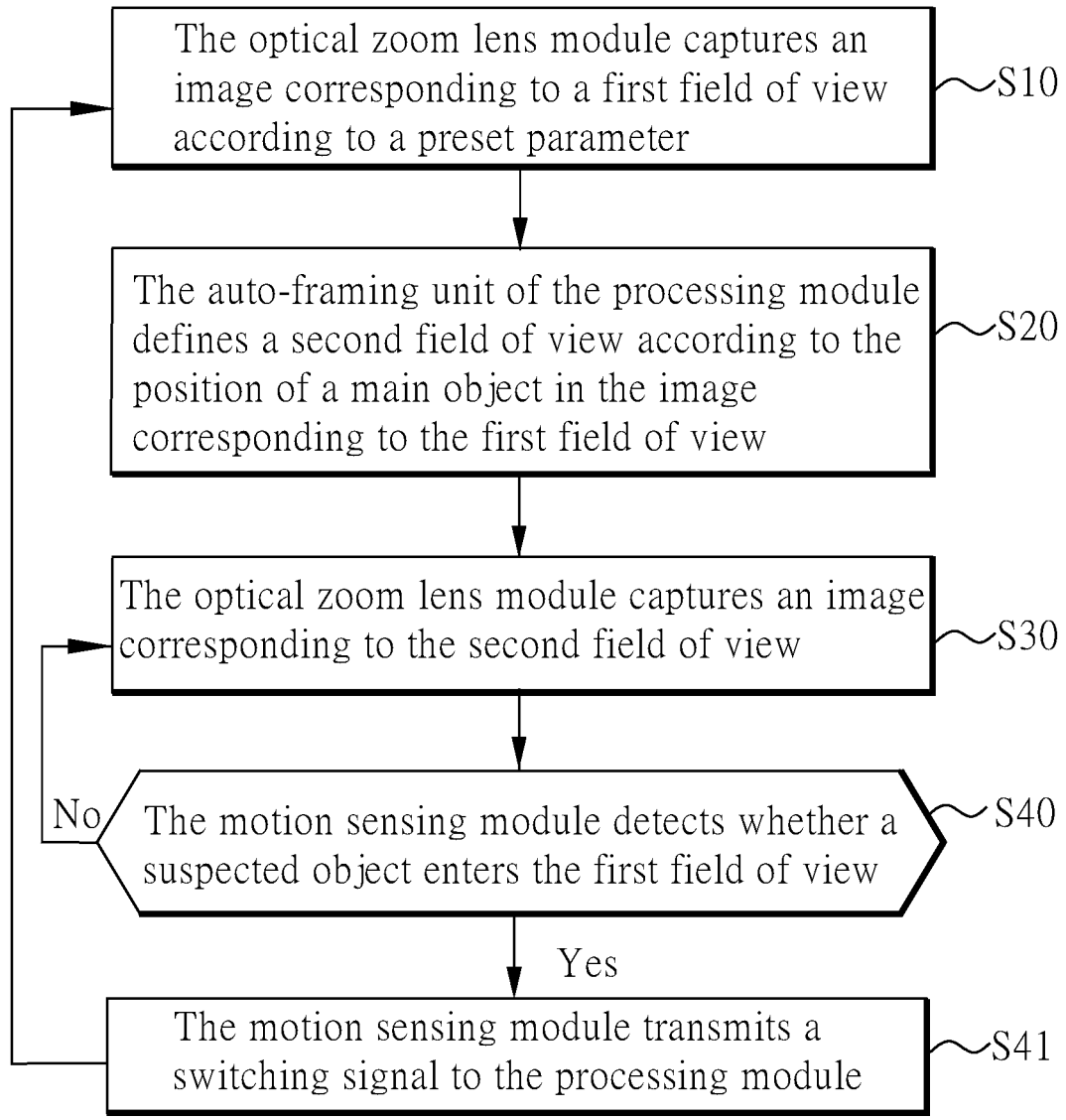
FIG. 5 illustrates a flowchart of the auto-framing method according to another embodiment of the present disclosure.
Figure 6A:
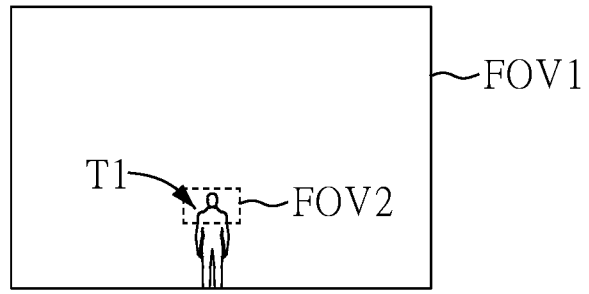
FIG. 6(a) to FIG. 6(d) illustrate schematic drawings of the auto-framing method as shown in FIG. 5.
Figure 6B:
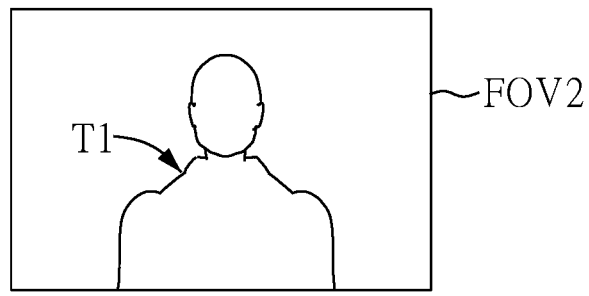

Please refer to FIG. 1, FIG. 5, and FIG. 6(a) to FIG. 6(d), wherein FIG. 5 illustrates a flowchart of the auto-framing method according to another embodiment of the present disclosure, and FIG. 6(a) to FIG. 6(d) illustrate schematic drawings of the auto-framing method as shown in FIG. 5. According to the above description, the auto-framing method in this embodiment comprises that: the optical zoom lens module 10 captures an image corresponding to a first field of view FOV1 according to a preset parameter (step S10); the auto-framing unit 22 of the processing module 20 defines a second field of view FOV2 according to the position of a main object T1 in the image corresponding to the first field of view FOV1 (step S20), as shown in FIG. 6(a); the optical zoom lens module 10 captures an image corresponding to the second field of view FOV2 (step S30), as shown in FIG. 6(b); and the motion sensing module 30 detects whether a suspected object T2 enters the first field of view FOV1 (step S40). If yes, the motion sensing module 30 transmits a switching signal to the processing module 20 (step S41), and then the method returns to step S10; otherwise, the method returns to step S30. Steps S10 to S41 of the auto-framing method in this embodiment are similar to the steps of the abovementioned embodiments, therefore there is no need for further description.

Figure 6C:
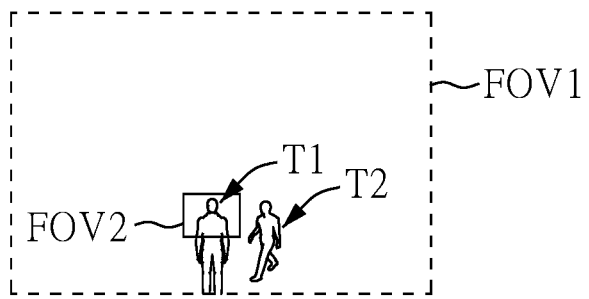
Figure 6D:
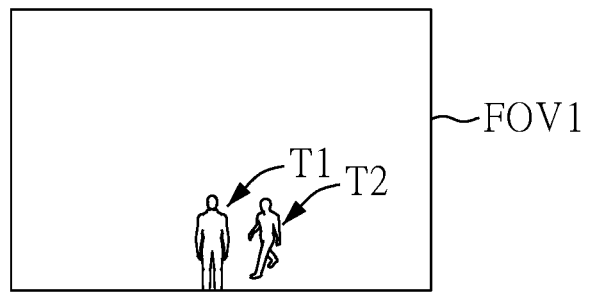

In this embodiment, when the motion sensing module 30 determines that the suspected object T2 exists outside of the second field of view FOV2 but within the first field of view FOV1, as shown in FIG. 6(c), the motion sensing module 30 would transmit the switching signal, and then the processing module 20 would return to step S10 according to the switching signal. At this time, the optical zoom lens of the optical zoom lens module 10 would be zoomed back to its initial setting, which is the image corresponding to the first field of view FOV1 according to the preset parameter, as shown in FIG. 6(d). Moreover, the auto-framing unit 22 would follow the same rule to determine and define the main object T1 within the first field of view FOV1, which may comprise one or more face features, so as to further redefine the second field of view FOV2.

In this embodiment, the processing module 20 controls the optical zoom lens module 10 to capture the image corresponding to the first field of view FOV1 according to the switching signal, as shown in FIG. 6(d). That is, the processing module 20 returns to its default mode according to the switching signal, so the processing module 20 would control the optical zoom lens of the optical zoom lens module 10 to capture images within the largest field of view (step S10). In FIG. 6(d), at this time, the image corresponding to the first field of view FOV1 covers both the main object T1 and the suspected object T2.

On the contrary, in step S40, if the motion sensing module 30 determines that no suspected object T2 enters the first field of view FOV1, the disclosure would keep performing step S30 to continue capturing images according to the focal length parameter corresponding to the second field of view FOV2.

As a result, during the video call or the video conference (in step S30), the motion sensing module 30 would keep detecting the area of the first field of view FOV1 (in step S40). If a new object (i.e., the suspected object T2) enters the first field of view FOV1, the optical zoom lens module 10 would return to its default mode to capture the image corresponding to the first field of view FOV1 (in step S10), and the auto-framing unit 22 would redefine the second field of view FOV2 following the same rule described in the abovementioned embodiments, such that the main object T1 within the second field of view FOV2 may comprise one or more face features, which means it may cover the face features of the new object. In other words, during the video call or the video conference, if a new object (i.e., the suspected object T2) enters an area outside of the second field of view FOV2, the optical zoom lens module 10 can automatically capture the image covering both the main object T1 and the suspected object T2 (i.e., within the second field of view FOV2), thereby achieving the auto-tracking function without the need of having the user to adjust the shooting range manually.

As described above, according to the image capturing device and the auto-framing method applied therefor of the present disclosure, the image capturing device comprises an optical zoom lens module, a processing module and a motion sensing module. The optical zoom lens module can capture an image corresponding to a first field of view according to a preset parameter. The auto-framing unit of the processing module defines a second field of view according to the position of a main object in the image corresponding to the first field of view. The optical zoom lens module captures the image corresponding to the second field of view. Meanwhile, the motion sensing module keeps detecting the first field of view, such that when the motion sensing module detects that a new object (i.e., the suspected object) enters the first field of view, the processing module can control the optical zoom lens module to capture either the image corresponding to the first field of view, or the image corresponding to a third field of view (which covers the suspected object). In other words, the optical zoom lens module would return to its default mode of capturing the image corresponding to the first field of view, or would capture the image covering the suspected object (i.e., within the third field of view), thereby achieving the auto-tracking function.

It is noted that the above-described embodiments are merely illustrative of preferred embodiments of the present disclosure, and that in order to prevent redundancy, not all possible combinations of the variations are described in detail; various changes and modifications may be made to the described embodiments without departing from the scope of the disclosure as described by the appended claims

What is claimed is:
1. An image capturing device, comprising:
an optical zoom lens module, configure to capture an image corresponding to a first field of view according to a preset parameter;
a processing module, electrically connected to the optical zoom lens module, the processing module including an auto-framing unit, wherein the auto-framing unit is configured to define a second field of view according to the position of a main object in the image corresponding to the first field of view, the second field of view is smaller than the first field of view, and the processing module is configured to control the optical zoom lens module to capture an image corresponding to the second field of view; and
a motion sensing module, electrically connected to the processing module, wherein when the motion sensing module detects that a suspected object enters the first field of view, the motion sensing module transmits a switching signal to the processing module, and the processing module controls the optical zoom lens module to capture an image corresponding to a third field of view according to the switching signal, wherein the suspected object is a moving object other than the main object, and wherein the suspected object is different from the main object.

2. The image capturing device as claimed in claim 1, wherein the preset parameter is a minimum magnification ratio or a largest field of view of the optical zoom lens module.

3. The image capturing device as claimed in claim 1, wherein the processing module comprises a face identification unit used for identifying the main object or the suspected object.

4. The image capturing device as claimed in claim 1, wherein the third field of view covers the suspected object.

5. The image capturing device as claimed in claim 1, wherein the switching signal includes a position information of the suspected object, and the processing module controls the optical zoom lens module to capture the image corresponding to the third field of view according to the position information.

6. The image capturing device as claimed in claim 5, wherein the auto-framing unit redefines the second field of view according to at least one of the position of the main object and the position of the suspected object.

7. The image capturing device as claimed in claim 1, wherein the motion sensing module comprises a radar.

8. An auto-framing method applied for an image capturing device, the image capturing device comprising an optical zoom lens module, a processing module and a motion sensing module, the processing module being electrically connected to the optical zoom lens module and the motion sensing module, and the processing module having an auto-framing unit, the auto-framing method comprising the following steps of:
the optical zoom lens module capturing an image corresponding to a first field of view according to a preset parameter;
the auto-framing unit of the processing module defining a second field of view according to the position of a main object in the image corresponding to the first field of view, wherein the second field of view is smaller than the first field of view;
the processing module controlling the optical zoom lens module to capture an image corresponding to the second field of view;
when the motion sensing module detecting that a suspected object enters the first field of view, the motion sensing module transmitting a switching signal to the processing module, wherein the suspected object is a moving object other than the main object, and wherein the suspected object is different from the main object; and
the processing module controlling the optical zoom lens module to capture an image corresponding to a third field of view according to the switching signal.

9. The auto-framing method as claimed in claim 8, wherein the preset parameter is a minimum magnification ratio or a largest field of view of the optical zoom lens module.

10. The auto-framing method as claimed in claim 8, wherein the processing module comprises a face identification unit used for identifying the main object or the suspected object.

11. The auto-framing method as claimed in claim 8, wherein the third field of view covers the suspected object.

12. The auto-framing method as claimed in claim 8, wherein the switching signal includes a position information of the suspected object, and the processing module controls the optical zoom lens module to capture the image corresponding to the third field of view according to the position information.

13. The auto-framing method as claimed in claim 12, further comprising the step of: the auto-framing unit redefining the second field of view according to at least one of the position of the main object and the position of the suspected object.

14. An image capturing device, comprising:
an optical zoom lens module, capturing an image corresponding to a first field of view according to a preset parameter;
a processing module, electrically connected to the optical zoom lens module, the processing module including an auto-framing unit, wherein the auto-framing unit defines a second field of view according to the position of a main object in the image corresponding to the first field of view, the second field of view is smaller than the first field of view, and the processing module controls the optical zoom lens module to capture an image corresponding to the second field of view; and
a motion sensing module, electrically connected to the processing module, wherein when the motion sensing module detects that a suspected object enters the first field of view, the motion sensing module transmits a switching signal to the processing module, and the processing module controls the optical zoom lens module to capture an image corresponding to the first field of view according to the switching signal, wherein the suspected object is a moving object other than the main object, and wherein the suspected object is different from the main object.

15. The image capturing device as claimed in claim 14, wherein the preset parameter is a minimum magnification ratio or a largest field of view of the optical zoom lens module.

16. The image capturing device as claimed in claim 14, wherein the processing module comprises a face identification unit used for identifying the main object or the suspected object.

17. The image capturing device as claimed in claim 14, wherein after the processing module controls the optical zoom lens module to capture the image corresponding to the first field of view according to the switching signal, the auto-framing unit redefines the second field of view according to the position of the main object and the position of the suspected object in the image corresponding to the first field of view.

18. The image capturing device as claimed in claim 17, wherein the auto-framing unit redefines the second field of view according to at least one of the position of the main object and the position of the suspected object in the image corresponding to the third field of view.

19. The image capturing device as claimed in claim 14, wherein the motion sensing module comprises a radar or an infrared sensor.

* * * * *